United States Patent [19]

Annovazzi

[11] Patent Number: 4,902,922
[45] Date of Patent: Feb. 20, 1990

[54] ALTERNATOR ROTOR, PARTICULARLY FOR MOTOR VEHICLES

[75] Inventor: Lorella Annovazzi, Segrate, Italy

[73] Assignee: Industrie Magneti Marelli S.r.l., Milan, Italy

[21] Appl. No.: 242,407

[22] Filed: Sep. 9, 1988

[30] Foreign Application Priority Data

Sep. 9, 1987 [IT] Italy ................. 53637/87[U]

[51] Int. Cl.⁴ .............................................. H02K 1/32
[52] U.S. Cl. ........................................ 310/61; 310/59; 310/263
[58] Field of Search ............... 310/263, 58, 59, 61, 310/62, 63

[56] References Cited

U.S. PATENT DOCUMENTS

| | | | |
|---|---|---|---|
| 3,590,294 | 6/1971 | Inagaki | 310/263 |
| 3,591,816 | 7/1971 | Sakamoto | 310/58 |
| 3,617,782 | 11/1971 | Nakamura | 310/263 |
| 3,742,266 | 6/1973 | Heller | 310/61 |
| 4,110,642 | 8/1978 | Thiele | 310/263 |
| 4,263,526 | 4/1981 | Taguchi | 310/263 |
| 4,614,889 | 9/1986 | Ikegami | 310/263 |

FOREIGN PATENT DOCUMENTS

| | | | |
|---|---|---|---|
| 0509725 | 3/1952 | Belgium | 310/263 |
| 1360344 | 3/1964 | France | 310/263 |
| 0036034 | 1/1969 | German Democratic Rep. | 310/61 |
| 0297961 | 6/1954 | Switzerland | 310/61 |

*Primary Examiner*—R. Skudy
*Attorney, Agent, or Firm*—Sughrue, Mion, Zinn, Macpeak & Seas

[57] ABSTRACT

The rotor comprises a shaft from which two facing pole plates extend radially, each having a plurality of radial pole fingers whose ends are bent towards the other pole plate and each of which extends between two adjacent fingers of the other pole plate. An excitation winding is situated between the plates coaxial with the shaft. At least one axial ventilation duct is formed in the shaft from which branch radial ducts in correspondence with the pole plates, the ducts communicating with the corresponding ventilation passages provided in each pole plate, which open into recesses defined between pairs of adjacent pole fingers.

2 Claims, 2 Drawing Sheets

ALTERNATOR ROTOR, PARTICULARLY FOR MOTOR VEHICLES

BACKGROUND OF THE INVENTION

The present invention relates to an alternator rotor, particularly for use in motor vehicles.

More specifically, the subject of the invention is a rotor comprising a shaft from which two facing pole plates extend radially, each of these having a plurality of radial pole fingers whose ends are bent towards the other pole plate and each of which extends between two adjacent fingers of the other pole plate; at least one excitation winding being situated between the plates, coaxial with the shaft.

The temperature of the rotor of an alternator tends to increase in operation, causing a corresponding increase in the resistance of the excitation winding. The excitation current is reduced correspondingly.

SUMMARY OF THE INVENTION

The object of the present invention is to produce an alternator rotor whose characteristics enable its operating temperature to be reduced and, in particular, enable the temperature and the increase in the resistance of the excitation winding to be limited so as to enable a higher current to flow in the winding for a given excitation voltage, with an increase in the efficiency of the alternator.

This object is achieved according to the invention by means of a rotor of the type specified above, whose main characteristic lies in the fact that at least one axial ventilation duct is formed in the shaft from which branch radial ducts in correspondence with the pole plates, the ducts communicating with corresponding ventilation passages provided in each pole plate, which open into recesses defined between pairs of adjacent pole fingers.

BRIEF DESCRIPTION OF THE DRAWINGS

Further characteristics and advantages of the rotor according to the present invention will become clear from the detailed description which follows with reference to the appended drawings, provided purely by way of non-limiting example, in which.

DETAILED DESCRIPTION OF THE INVENTION

With reference to the drawings, an alternator rotor according to the present invention comprises a shaft 1 onto which two axially-spaced facing pole plates 2 are keyed in known manner. A plurality of radial pole fingers 3 extend from each of the plates and are bent towards the other pole plate, each extending between two adjacent fingers 3 of the other pole plate.

Figure 3:
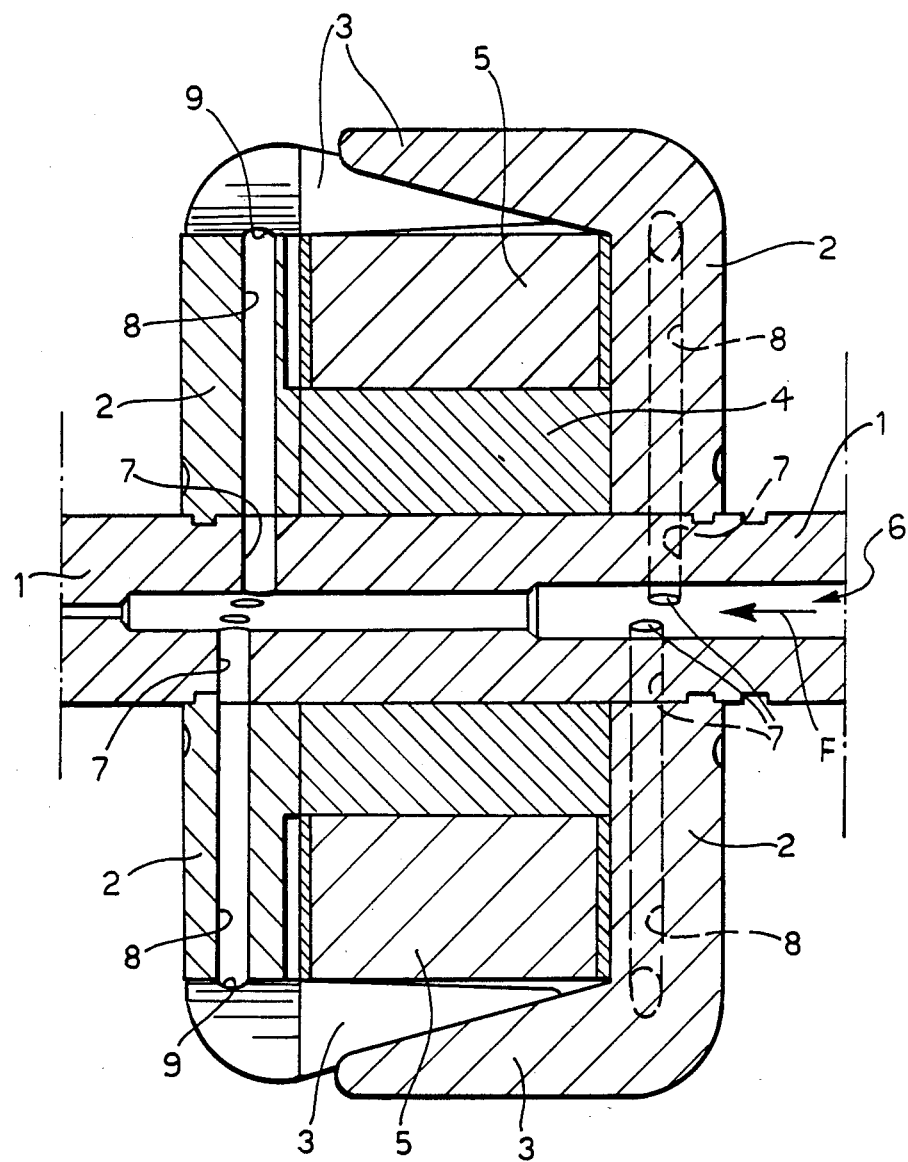
FIG. 3 is an axial section taken on the line III—III of FIG. 1.

An annular core, for example of soft iron, is indicated 4 and is arranged around the shaft 1 between the pole plates 2 (FIG. 3). An excitation winding 5, for example of copper wire, is arranged around the core.

The shaft 1 is hollow, an axial ventilation duct 6 being formed within it.

Radial ducts 7 (FIGS. 2 and 3) branch from the axial ventilation duct 6 of the shaft 1 in correspondence with the pole plates 2 and communicate with corresponding radial ventilation passages 8 provided in each pole plate 2, these passages opening through apertures 9 into recesses 10 defined between pairs of adjacent pole fingers 3.

As can be seen from FIG. 3, the radial ducts 7 of the shaft 1 associated with each pole plate and the radial ventilation passages 8 of each pole plate are formed in axially staggered positions.

The system formed by the axial ventilation duct 6 and radial ventilation ducts 7 of the shaft 1 and by the radial ventilation passages 8 enables an air flow to be induced radially through the pole plates in order to reduce their temperature in operation.

Figure 1:
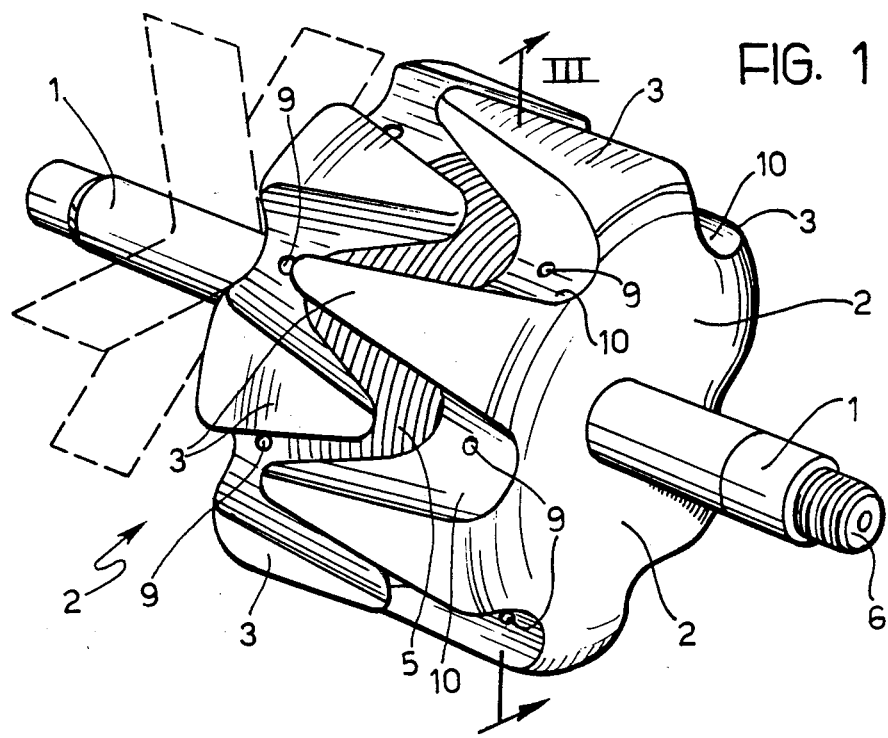
FIG. 1 is a perspective view of a rotor produced according to the present invention.
Figure 2:
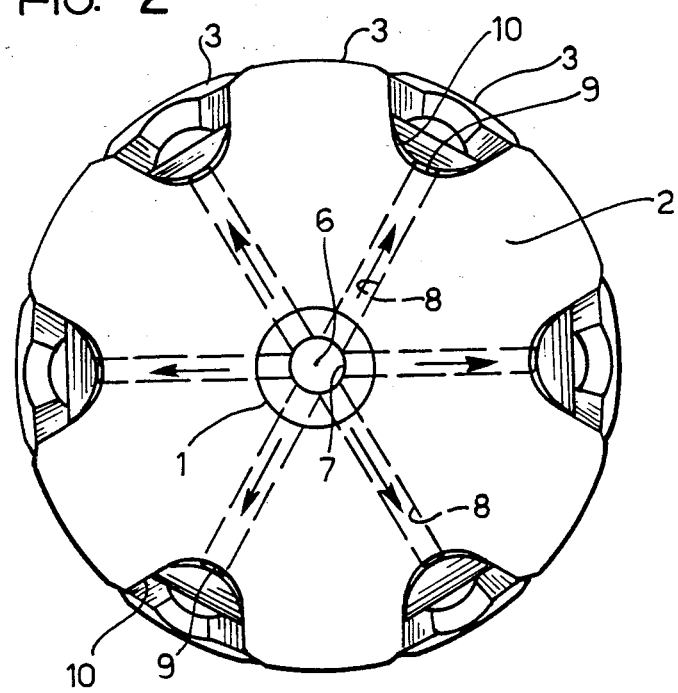
FIG. 2 is a front view of the rotor shown in FIG. 1.

A vaned rotor or fan, such as that illustrated in broken outline in FIG. 1, may be coupled, in known manner, to the shaft 1 as a result of which, during rotation of the rotor, an air flow is drawn through the axial ventilation duct 6 in the direction of the arrow F of FIG. 3 and then radially outwardly through the radial ventilation passages 8 in the pole plates, as indicated by the arrows of FIG. 2.

The efficient ventilation of the rotor enables the increase in temperature of the excitation winding 5 to be limited and the efficiency of the alternator thus to be improved.

I claim:

1. An alternator rotor, particularly for motor vehicles, comprising a shaft from which two facing pole plates extend radially, each having a plurality of radial pole fingers whose ends are bent towards the facing pole plate and each of which extends between two adjacent fingers of the facing pole plate; at least one excitation winding being situation between the plates coaxial with the shaft; at least one axial ventilation duct being forming in the shaft from which branch radial ducts in alignment with the pole plates, a plurality of radial ventilation passages provided in each pole plate which are in communication with said radial ducts and which open into recesses defined between pairs of adjacent pole fingers.

2. A rotor according to claim 1, wherein the radial ducts of the shaft and the ventilation radial passages of the pole plates are axially staggered.

* * * * *